(12) United States Patent
Seo et al.

(10) Patent No.: US 7,872,711 B2
(45) Date of Patent: Jan. 18, 2011

(54) OPTICAL SHEET FOR TFT-LCD BACK LIGHT UNIT AND LIQUID CRYSTAL DISPLAY HAVING THE OPTICAL SHEET

(75) Inventors: Jeong Tae Seo, Gumi-si (KR); Moon Bok Lee, Gumi-si (KR); Jun Sang Park, Gumi-si (KR)

(73) Assignee: Toray Advanced Materials Korea Inc., Gumi-Si (KR)

( * ) Notice: Subject to any disclaimer, the term of this patent is extended or adjusted under 35 U.S.C. 154(b) by 376 days.

(21) Appl. No.: 12/197,697

(22) Filed: Aug. 25, 2008

(65) Prior Publication Data
US 2010/0002436 A1    Jan. 7, 2010

(30) Foreign Application Priority Data
Jul. 7, 2008    (KR) ...................... 10-2008-0065382

(51) Int. Cl.
*G02F 1/1335*    (2006.01)
*G02B 5/02*    (2006.01)
*F21V 5/00*    (2006.01)

(52) U.S. Cl. .......................... 349/112; 359/599; 362/246
(58) Field of Classification Search ................. 349/112; 359/599; 362/246
See application file for complete search history.

(56) References Cited

U.S. PATENT DOCUMENTS 6,822,707 B2 *  11/2004  Ariyoshi et al. .............. 349/112
7,656,473 B2 *   2/2010  Ha et al. ........................ 349/64

\* cited by examiner

*Primary Examiner*—Mike Qi
(74) *Attorney, Agent, or Firm*—Reinhart Boerner Van Deuren P.C.

(57) ABSTRACT

The present invention relates to an optical sheet for a backlight unit of a TFT-LCD and a TFT-LCD including the same. The optical sheet of the present invention includes a transparent base sheet, and a light diffusion layer in which a diffusion pattern comprised of a plurality of protrusions is formed on the transparent base sheet. The diffusion pattern satisfies an aspect ratio of 0.8 or more, the aspect ratio being a ratio of a radius (l) of a unit body portion of the protrusion, which is formed on the transparent base sheet, to a thickness (d) of the protrusion.

20 Claims, 3 Drawing Sheets

OPTICAL SHEET FOR TFT-LCD BACK LIGHT UNIT AND LIQUID CRYSTAL DISPLAY HAVING THE OPTICAL SHEET

CROSS-REFERENCE TO RELATED PATENT APPLICATIONS

This patent application claims the benefit of Korean Patent Application No. 2008-65382, filed on Jul. 7, 2008, the entire teachings and disclosure of which are incorporated herein by reference thereto.

BACKGROUND OF THE INVENTION

1. Field of the Invention

The present invention relates to an optical sheet for a backlight unit of a thin film transistor-liquid crystal display (hereinafter referred to as a 'TFT-LCD') and a TFT-LCD including the same, and more particularly, to an optical sheet that can obtain a sharp optical image by inducing uniform light diffusion while passing light irradiated from a light source lamp disposed on the lateral or rear side of a display therethrough, and a TFT-LCD including the same.

2. Background of the Related Art

A liquid crystal display (LCD) is an ultra-thin image output device with low consumption power, low heat generation and high definition and has recently been spotlighted as image display devices of various industry fields. However, LCD uses liquid crystal made of a non-light emitting material unlike other flat panel display types, and hence requires an additional light-emitting device in order to improve the brightness of a display screen.

The additional light-emitting device includes backlight unit largely classified into a front-light process and a back-light process. The backlight method is an indirect lighting process in which light generated from a light source of a backlight unit attached to the rear side of a display device is guided to reach an opposite side through a light guide plate, and is reflected from a reflection sheet, such as a metal deposition plate or an opaque white sheet and then output to the front side, thus improving the brightness of a display screen. In this backlight process, it is necessary to implement maximum image brightness with minimum consumption power.

Therefore, in order to fulfill this requirement, a method of fabricating an optical sheet in which a light diffusion layer is formed on at least one side of a base sheet so as to transfer light emitted from a light source to a liquid crystal driver has been spotlighted.

Here, the optical sheet plays a role in uniformly diffusing the light, which is irradiated from a light source lamp and then passes through the diffusion sheet or a light guide plate, while having the light pass therethrough without a loss. The optical sheet should have a high total light transmittance and a high haze characteristic as the most important characteristics.

The optical sheet further requires a high optical efficiency, that is, a high luminance characteristic based on these optical characteristics. In other words, distribution and path of light, which is constantly formed from the light source, must be changed to forward light necessary for a LCD.

This optical sheet is typically prepared by coating a composition, comprising polymer resin and spherical particles, on a base sheet, and comprise a body portion to which light is incident and protrusions formed by the particles.

However, the conventional optical sheet has a low aspect ratio between the body portion and the protrusions and accordingly does not accomplish high efficiency necessary for the optical sheet, that is, a desired degree of high luminance.

In view of the above fact, the present inventors had made an effort to improve a low high-luminance characteristic of the conventional optical sheet, and have consequently completed an optical sheet being suitable for a TFT-LCD backlight and having a high total light transmittance and a high haze characteristic in particular, high luminance, including a light diffusion layer in which a diffusion pattern formed of a plurality of protrusions is formed on a base sheet, by specifying a ratio of the radius (l) of a unit body portion of the protrusion formed on the base sheet versus a thickness (d) of an protrusion.

SUMMARY OF THE INVENTION

Accordingly, the present invention has been made in view of the above problems occurring in the prior art, and it is an object of the present invention to provide an optical sheet for a backlight unit of a TFT-LCD with high luminance, in which the optical sheet comprises a transparent base sheet, and a light diffusion layer in which a diffusion pattern is formed of a plurality of protrusions by specifying an aspect ratio of the radius (l) of a unit body portion of the protrusion formed on the base sheet versus a thickness (d) of an protrusion.

It is another object of the present invention to provide a backlight assembly including the optical sheet.

It is further another object of the present invention to provide a TFT-LCD including the optical sheet.

To achieve the above objects, according to the present invention, there is provided an optical sheet for a backlight unit of a TFT-LCD, comprising a transparent base sheet, and a light diffusion layer formed on the transparent base sheet, in which the light diffusion layer has a diffusion pattern comprised of a plurality of protrusions. The diffusion pattern has an aspect ratio of 0.8 or more, the aspect ratio being a ratio of a radius (l) of a unit body portion of the protrusion, which is formed on the transparent base sheet, to a thickness (d) of the protrusion. More preferably, the aspect ratio ranges from 0.8 to 1.5.

In the present invention, the diffusion pattern has a surface shape formed by an e-beam irradiation apparatus. The e-beam is irradiated to emit thermal electrons by heating a high-melting point material filament made of at least one selected from the group consisting of tungsten, tantalum and molybdenum.

The e-beam is irradiated within a wavelength range of 0.005 to 0.1 nm. A preferred absorbed dose is 40 to 120 kGy.

Further, the plurality of protrusions has a spherical or semi-spherical shape. The radius (l) of the unit body portion of the protrusion ranges from 0.005 to 50 μm.

The present invention provides a backlight assembly including the optical sheet with high luminance.

Further, the present invention provides a TFT-LCD including the optical sheet with high luminance.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with specific embodiments with reference to the accompanying drawings.

The present invention provides an optical sheet including a transparent base sheet, and a light diffusion layer in which a diffusion pattern comprised of a plurality of protrusions is formed on the transparent base sheet, the diffusion pattern has an aspect ratio of 0.8 or more, and the specific aspect ratio is defined the correlation between a ratio of the radius (l) of a unit body portion of the protrusion formed on the base sheet and a thickness (d) of a protrusion, so, the aspect ratio satisfies below:

$$\frac{\text{a thickness}(d) \text{ of the protrusion}}{\text{a radius}(l) \text{ of a unit body portion of the protrusion}} \geq 0.8$$

Figure 1:
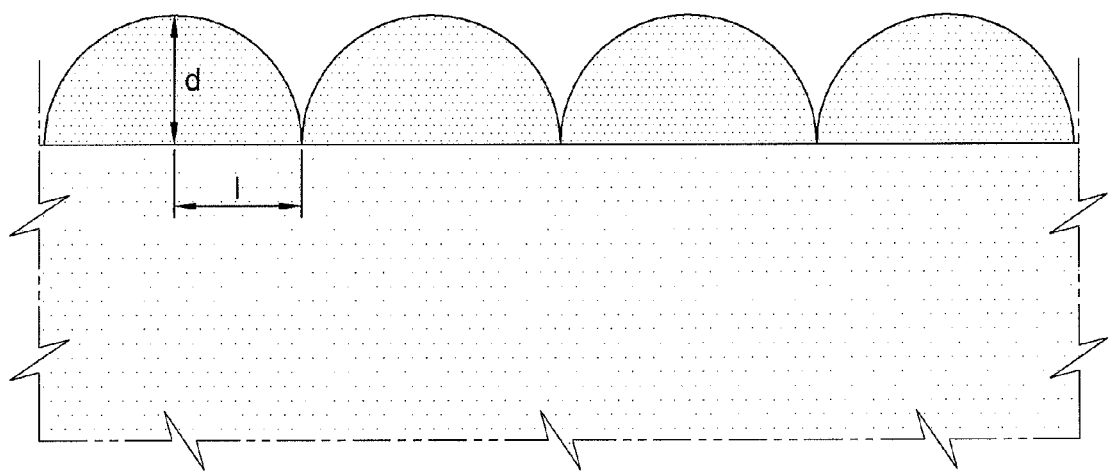
FIG. 1 is a diagram defining the aspect ratio when a diffusion pattern of protrusions of an optical sheet according to the present invention has a semi-spherical form.
Figure 2:
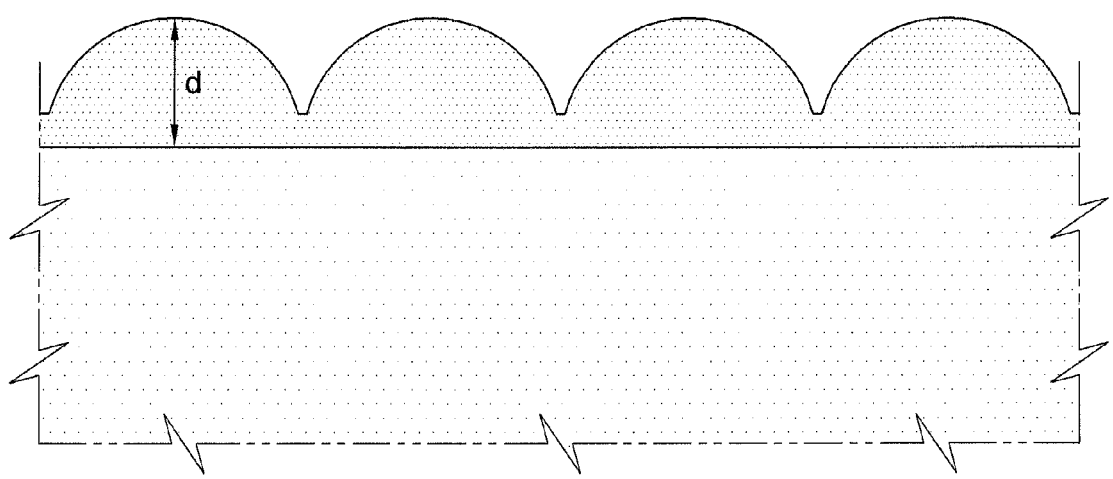
FIG. 2 is a diagram showing a surface shape of the protrusion before e-beam irradiation when fabricating the optical sheet of the present invention.

FIG. 1 is a diagram defining the aspect ratio when a diffusion pattern of protrusions of an optical sheet according to the present invention has a semi-spherical form. The optical sheet of the present invention has the aspect ratio of, preferably, 0.8 or higher, more preferably, 0.8 to 1.5. Here, when the aspect ratio is less than 0.8, the condensing property of light is degraded, and when the aspect ratio exceeds 1.5, the amount of total reflection of light increases, resulting in reduced luminance.

The optical sheet of the present invention includes the light diffusion layer having the plurality of protrusions formed on the transparent base sheet, wherein the light diffusion layer fulfills a high aspect ratio. Means for fulfilling the aspect ratio defined in the present invention is not particularly limited.

Thus, the present invention provides the optical sheet having the plurality of protrusions constituting a spherical or semi-spherical diffusion pattern, formed on the transparent base sheet by coating a composition, which is comprised of polymer resin and light diffusion particles, drying the composition, and then illuminating an e-beam to the composition.

The diffusion pattern formed in the optical sheet of the present invention is accomplished by primarily forming the diffusion pattern to have a surface shape using a coating method and then illuminating an e-beam to the surface in order to satisfy an aspect ratio of 0.8 to 1.5, thus the protrusions of the spherical or semi-spherical diffusion pattern are formed.

More specifically, the surface shape of the protrusions can be accomplished by controlling the degree of cross-linking of polymer resin and organic particles used in the composition and the energy amount of e-beam irradiated. That is, an e-beam is irradiated to the surface comprised of cross-linked organic particles and non-cross-linked polymer resin, and then induces decomposition of the non-cross-linked polymer resin layer. Thus, the surface shape having a target aspect ratio can be implemented by making prominent the spherical surface shape of the relatively cross-linked organic particles.

The e-beam irradiation used in the present invention employs an e-beam wavelength ranging from 0.005 to 0.1 nm and is a method of emitting thermal electrons by heating a filament made of high-melting point material. The high-melting point material filament uses any one selected from the group consisting of tungsten, tantalum and molybdenum.

The filament is mounted in an electron gun and is generally in a high-vacuum state because it must be able to supply a large amount of electrons and should not be influenced by ambient atmosphere.

The unit of e-beam irradiation is the absorbed dose (kGy), and the absorbed dose differs depending on use, a required product, etc. A preferred absorbed dose of the e-beam according to the present invention ranges from 40 to 120 kGy. Here, in a region where e-beam irradiates the absorbed dose of less than 40 kGy, the e-beam induces dioxin decomposition and a petrol organic compound decomposition. In a region where e-beam irradiates the absorbed dose of 50 kGy, it has a polymer-hardening function. Further, in a region where e-beam has the absorbed dose of 60 to 120 kGy, the e-beam has decomposition and shrinking function of polymer material and so on. In the present invention, the spherical surface shape can be made prominent by controlling the absorbed dose in an e-beam absorbed dose range in which polymer resin is decomposable.

In the optical sheet, the plurality of protrusions can be controlled according to light diffusion particles dispersed in the polymer resin and the size thereof.

Here, the radius (l) of the unit body portion of the protrusion satisfies 0.005 to 50 μm. If the radius (l) gets out of the range, an optical efficiency improvement effect is insufficient; the optical sheet of the present invention is not preferable for use in a TFT-LCD backlight unit.

The most preferred light diffusion particles used in the present invention include one or more kinds selected from the group consisting of acrylic resin, polyurethane, polyvinyl chloride, polystyrene, polyacrylonitrile, polyamide, and polymethyl methacrylate and preferably have a spherical form. In particular, when fabricating the light diffusion particles, particles cross-linked by a cross-linking agent are used.

It is preferred that the organic particles are transparent; more preferably, colorless and transparent in order to maximize the light dosimetry transmitting the optical sheet.

Further, the particle size of the organic particles is preferably 0.1 to 100 μm, more preferably, 20 to 70 μm. Here, if the particle size is 0.1 μm or less, the light diffusion effect is insufficient. If the particle size is 100 μm or more, coating of a resin composition forming the light diffusion layer becomes difficult, causing a problem in that the particles are left after lamination.

The polymer resin used in the light diffusion layer of the present invention may be of any kind, so long as it is a hardening type resin and includes, more preferably, thermosetting resin in terms of handling and easy availability. Preferred examples of the thermosetting resin can include urea resin, melamine resin, phenol resin, epoxy resin, unsaturated polyester resin, alkyd resin, urethane resin, acrylic resin, polyurethane, fluorine-based resin, silicon-based resin, polyamideimide and so on. Moreover, the light diffusion layer can be further blended in a plasticizer, a stabilizer, a deterioration-preventing agent, a disperser, a defoaming agent, a forming agent or the like as well as the polymer resin.

In order to fabricate an optical sheet with a desired optical characteristic whose light transmittance ranges from 85 to 95%, it is important to control a mixing ratio between the polymer resin and the organic particles. The organic particles are used in a ratio of, preferably, 0.1 to 1000 parts by weight based on the 100 parts by weight of the polymer resin, more preferably, 10 to 500 parts by weight. Here, if the mixing amount of the organic particles is 0.1 parts by weight or less, the light diffusion effect is insufficient. If the mixing amount of the organic particles exceeds 1000 parts by weight, coating of the resin composition forming the light diffusion layer becomes difficult.

In order to control light transmittance and obtain total light transmittance of 85 to 95%, it is necessary to control the thickness of the light diffusion layer. The thickness of the light diffusion layer is preferably 0.2 to 500 μm, more preferably, 2 to 200 μm. If the coating thickness is 0.2 μm or less, problems arise because adhesive strength with a film upon coating is weak and particles are left after lamination. If the coating thickness is 500 μm or more, a desired diffusion film cannot be formed since the total light transmittance becomes 84% or less.

The base sheet used in the present invention need to have a ray of light pass therethrough and includes a transparent synthetic resin, in particular, a colorless transparent synthetic resin. An example of the based sheet can be selected from polyethylene terephthalate, polyethylene naphthalate, acrylic resin, polycarbonate, polystyrene, polyolefin, cellulose acetate and so on, but not limited thereto.

The thickness of the transparent base sheet according to the present invention is not specifically limited, but can be preferably 10 to 500 μm, more preferably, 75 to 250 μm. If the thickness of the base sheet is 10 μm or less, curl is likely to occur due to the resin composition forming the light diffusion layer. If the thickness of the base sheet is 500 μm or more, luminance of a liquid crystal display device is degraded and the thickness of the backlight unit increases, which contradicts the thin requirement of a liquid crystal display device.

The optical sheet of the present invention can have an anti-blocking layer on another surface of the transparent base sheet of which the light diffusion layer is formed.

The anti-blocking layer is comprised of anti-blocking polymer resin and anti-blocking particles. The anti-blocking polymer resin is preferably hardening resin, more preferably, thermosetting resin in terms of handling and easy availability. The thermosetting resin can preferably include any one selected from the group consisting of urea resins, melamine resin, phenol resin, epoxy resin, unsaturated polyester resin, alkyd resin, urethane resin, acrylic resin, polyurethane, fluorine-based resin, silicon-based resin and polyamideimide, but not specifically limited thereto. The anti-blocking polymer resin is preferably colorless and transparent because light passes therethrough. Further, the anti-blocking polymer resin can have a plasticizer, a stabilizer, a deterioration-preventing agent, a disperser, a defoaming agent, a forming agent, wax, an anti-charging agent or the like further mixed therewith.

The anti-blocking particles can include any one material selected from the group consisting of acrylic resin, polyurethane, polyvinyl chloride, polystyrene, polyacrylonitrile, polyamide and polymethyl methacrylate and preferably have a spherical form. Here, an amount of the particles used in the anti-blocking layer is 0.01 to 500 parts by weight based on the 100 parts by weight of the polymer resin. More preferably, the particles of 0.1 to 100 parts by weight can be used. If the particles are used in an amount of 0.01 parts by weight or less, a blocking phenomenon in which a film traveling property during process is deteriorated occurs. If an amount of the particles exceeds 500 parts by weight, coating of the resin composition forming the anti-blocking layer becomes difficult.

The particles for the anti-blocking layer are also preferably colorless and transparent in order to maximize the light dosimetry in which light passes through the light diffusion sheet and can have a particle size of 0.1 to 100 μm, more preferably, 0.1 to 50 μm. Here, if the particle size is 0.1 μm or less, a blocking phenomenon in which a film traveling property during process is deteriorated occurs. If the particle size exceeds 100 μm, there are problems in that coating of the resin composition forming the anti-blocking layer becomes difficult and the particles are left after laminating the anti-blocking layer.

Further, in order to ensure a high light transmittance and a blocking-prevention function and obtain the total light transmittance of 85 to 95%, the thickness of the coating layer of the anti-blocking layer can be controlled. The thickness of the coating layer of the anti-blocking layer can be, preferably, 0.1 to 100 μm, more preferably, 0.1 to 50 μm, most preferably, 0.1 to 20 μm. Here, if the thickness of the anti-blocking layer is 0.1 μm or less, problems arise adhesive strength with the base sheet at the time of coating becomes weak and particles are left after lamination. If the thickness of the anti-blocking layer exceeds 100 μm, the total light transmittance becomes 84% or less, making it difficult to fabricate a desired light diffusion sheet.

In view of the above, the optical sheet of the present invention has a high total light transmittance and a high Haze characteristic, in particular, a high luminance [Table 6]. Accordingly, the optical sheet of the present invention can obtain a sharp optical image by inducing uniform light diffusion while passing light irradiated from the light source lamp disposed on the lateral or rear side of the LCD therethrough. Therefore, the optical sheet of the present invention is suitable for a TFT-LCD backlight unit. The present invention provides a backlight assembly including the optical sheet with improved luminance.

Further, the present invention provides a TFT-LCD including the optical sheet with improved luminance.

The present invention is described below in more detail in connection with embodiments.

The present embodiment is intended to describe the present invention more specifically, and it is to be understood that the scope of the present invention is not limited to the embodiments.

Example 1

Figure 3:
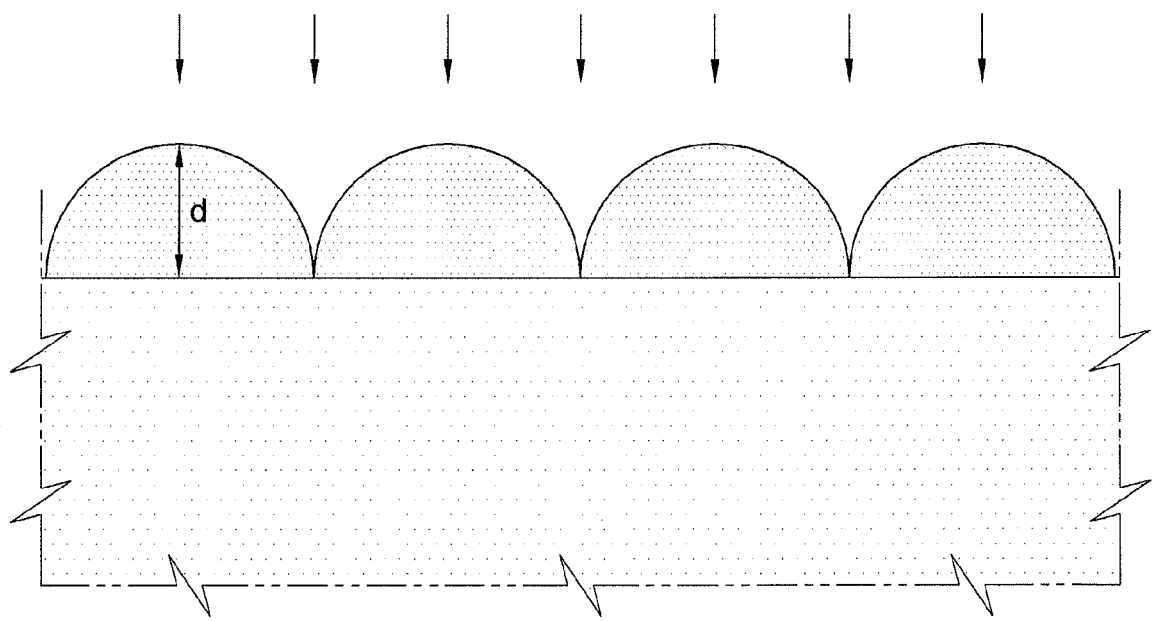
FIG. 3 is a diagram showing a surface shape of the protrusion after e-beam irradiation when fabricating the optical sheet of the present invention.

A coating agent having a composition ratio of the following Table 1 was coated on one surface of a high transparent polyester film (Toray Saehan Inc. XG533-100 μm) using the Mayer bar and then dried at a temperature of 110 μm for 60 seconds, thereby forming a light diffusion coating layer having a thickness of 30 μm. Thereafter, an e-beam (Iwasaki Electric Mfg. Co., Ltd. EZCure) having an absorbed dose of 100 kGy was irradiated to the light diffusion coating layer using an acceleration voltage of 90 Kv, thus fabricating an optical sheet in which the diffusion pattern as shown in FIG. 3 was formed.

TABLE 1

| | Composition | Contents |
|---|---|---|
| Optical diffusion resin | Acrylic-based resin (Aekyung Chemical Co., Ltd. A-811) | 30 g |
| Optical diffusion particle | PMMA of 20 μm in particle size | 30 g |
| Solvent | Methylethylketone | 40 g |

Example 2

A coating agent having a composition ratio of the following Table 1 was coated on one surface of a high transparent polyester film (Toray Saehan Inc. XG533-100 μm) using the Mayer bar and then dried at a temperature of 110 μm for 60 seconds, thereby forming a light diffusion coating layer of 30 μm in thickness. Thereafter, an e-beam (Iwasaki Electric Mfg. Co., Ltd. EZCure) having an absorbed dose of 60 kGy was irradiated to the light diffusion coating layer using an acceleration voltage of 90 Kv, thus fabricating an optical sheet in which the diffusion pattern as shown in FIG. 3 was formed.

TABLE 2

| | Composition | Contents |
|---|---|---|
| Optical diffusion resin | Acrylic-based resin (Aekyung Chemical Co., Ltd. A-811) | 30 g |
| Optical diffusion particle | PMMA of 30 μm in particle size | 30 g |
| Solvent | Methylethylketone | 40 g |

Example 3

A coating agent for an anti-blocking layer, having a composition of the following Table 3, was coated on a rear surface of the base sheet on which the light diffusion layer fabricated in the Example 1 was formed. The coating agent was dried at a temperature of 110 μm for 40 seconds, thereby forming an optical sheet in which the anti-blocking layer of 5 μm in thickness was formed.

TABLE 3

| | Composition | Contents |
|---|---|---|
| Anti-blocking resin | Acrylic-based resin (Aekyung Chemical Co., Ltd. A-811) | 28 g |
| Anti-blocking particle | Acrylic-based particle (SOKEN MX300) | 0.5 g |
| Solvent | Methylethylketone | 70 g |
| Anti-charging agent | Anion anti-charging agent | 1.5 g |

Comparative Example 1

A coating agent having a composition ratio of the following Table 4 was coated on one surface of a high transparent polyester film (Toray Saehan Inc. XG533-100 μm) using the Mayer bar and then dried at a temperature of 110 μm for 60 seconds, thereby forming an optical sheet of 30 μm in thickness.

TABLE 4

| | Composition | Contents |
|---|---|---|
| Optical diffusion resin | Acrylic-based resin (Aekyung Chemical Co., Ltd. A-811) | 30 g |
| Optical diffusion particle | Acrylic-based particle (SOKEN MX1000) | 30 g |
| Solvent | Methylethylketone | 40 g |

Experimental Example 1

Measurement of the Aspect Ratio

The cross section of the optical sheet fabricated above was cut, and the aspect ratio of the optical sheet was measured using a Scanning Electron Microscope (Hitachi, S-3400N).

The measured aspect ratio is defined a ratio of a radius (l) of a unit body portion of the protrusion to a thickness (d) of the protrusion as illustrated in FIG. 1, and the results of the aspect ratios of the respective optical sheets were listed in the following Table 5.

TABLE 5

| Process condition | Radius (l) of body portion | Thickness (d) of protrusion | Aspect ratio |
|---|---|---|---|
| Comparative Example 1 | 15 μm | 10.5 μm | 0.70 |
| Example 1 | 15 μm | 14.5 μm | 0.96 |
| Example 2 | 15 μm | 12.5 μm | 0.83 |

From the above results, it could be seen that, by optimizing an e-beam irradiated to the light diffusion layer when forming the surface shape, the aspect ratio, that is, the radius (l) of the unit body portion of the protrusion, which is formed on the transparent base sheet, versus the thickness (d) ratio of the protrusion fulfilled 0.8 or higher.

Experiment Example 2

Measurement of Optical Characteristic

1. Measurement of Total Light Transmittance

The following experiments were carried out so as to verify the light transmission ability and light distribution ability of the optical sheets fabricated as above.

While light of 550 nm was transmitted perpendicular to a 10 cm×10 cm sized light-diffusing sheet sample which had been stood upright, the amount of light was measured using an automatic digital hazemeter, available from Nippon Denshoku Industries Co., Ltd. The total light transmittance values were calculated using the following Equation 1, and the calculation results were listed in Table 6.

$$\text{Full light Transmittance (\%)} = \left[\frac{\text{Total amount of light transmittance}}{\text{Amount of incident light}}\right] \times 100 \quad \text{[Equation 1]}$$

2. Haze Measurement

Haze of the fabricated optical sheets was calculated using Equation 2 and the measured results were listed in Table 6.

$$\text{Haze (\%)} = \left[\frac{\text{Total amount of light transmittance} - \text{amount of straight light}}{\text{Total amount of light transmittance}}\right] \times 100 \quad \text{[Equation 2]}$$

3. Luminance Measurement

The optical diffusion ability of the optical sheets manufactured as above was measured according to the following procedures.

Luminance was measured using a 32" direct lighting type backlight unit, and the optical sheet was cut and mounted on the light diffusion sheet. Luminance of 13 lamp positions in the backlight unit and 12 space points between the lamps was repeatedly measured nine times using a measurement apparatus (BM-7 by Topcone Co., Ltd.) based on a measurement angle of 0.2 degrees and a distance of 25 cm between the backlight unit and the apparatus BM-7. A difference between an average luminance value at the lamp portions and an average luminance value at portions where the lamps did not exit and was then represented by a light diffusion property. Further, the difference of the average luminance values, that is, the average luminance value at the lamp portions—the average luminance value at the portions with no lamps were listed in the following Table 6.

TABLE 6

| Type | Full light transmittance (%) | Haze (%) | Luminance (cd/μm) |
|---|---|---|---|
| Example 1 | 69 | 82 | 4,800 |
| Example 2 | 67 | 83 | 5,200 |
| Comparative Example 1 | 68 | 80 | 3,000 |

The above results showed that an optical sheet having a high aspect ratio of 0.8 or more had better luminance than that of the conventional optical sheet. The optical sheet fulfilling a high aspect ratio of the present invention can obtain a sharp optical image by inducing uniform light diffusion while having light, irradiated from the light source lamp disposed on the lateral or rear side of a display, pass therethrough, and is preferably useful in a TFT-LCD backlight unit.

As described above, the optical sheet according to the present invention comprises the transparent base sheet and the light diffusion layer in which the diffusion pattern comprised of the plurality of protrusions formed on the transparent base sheet. The diffusion pattern specifies the aspect ratio, that is, a ratio of the radius (l) of the unit body portion of the protrusion to the thickness (d) of the protrusion. Accordingly, the optical sheet of the present invention having high luminance is useful in optical materials for a TFT-LCD backlight unit.

As mentioned above, first, the present invention provides the optical sheet which has satisfied a specific aspect ratio in the shape of the diffusion pattern. The specific aspect ratio is defined the correlation between a ratio of the radius (l) of a unit body portion of the protrusion formed on the base sheet and a thickness (d) of a protrusion.

Second, the optical sheet of the present invention can improve luminance when compared with the prior art and therefore obtain a sharp optical image by inducing uniform light diffusion while having light, irradiated from the light source lamp disposed on the lateral or rear side of a display, pass therethrough. Accordingly, the optical sheet of the present invention is useful in a TFT-LCD backlight unit.

Third, the present invention can provide a backlight assembly including the optical sheet, which satisfies a specific aspect ratio and has improved luminance and also a TFT-LCD including the optical sheet.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An optical sheet for a backlight unit of a TFT-LCD, comprising:
    a transparent base sheet; and
    a light diffusion layer in which a diffusion pattern comprised of a plurality of protrusions is formed on the transparent base sheet,
    wherein the diffusion pattern has an aspect ratio of 0.8 or more, the aspect ratio satisfies below:

$$\frac{\text{a thickness}(d) \text{ of the protrusion}}{\text{a radius}(l) \text{ of a unit body portion of the protrusion}} \geq 0.8.$$

2. The optical sheet as claimed in claim 1, wherein the diffusion pattern has a surface shape formed by an e-beam irradiation apparatus.

3. The optical sheet as claimed in claim 2, wherein the e-beam is irradiated to emit thermal electrons by heating a high-melting point material filament made of at least one selected from the group consisting of tungsten, tantalum and molybdenum.

4. The optical sheet as claimed in claim 2, wherein the e-beam is irradiated within a wavelength range of 0.005 to 0.1 nm.

5. The optical sheet as claimed in claim 2, wherein the e-beam is irradiated in an absorbed dose of 40 to 120 kGy.

6. The optical sheet as claimed in claim 1, wherein the aspect ratio ranges from 0.8 to 1.5.

7. The optical sheet as claimed in claim 1, wherein the plurality of protrusions has a spherical or semi-spherical shape.

8. The optical sheet as claimed in claim 1, wherein the radius (l) of the unit body portion of the protrusion ranges from 0.005 to 50 μm.

9. The optical sheet as claimed in claim 1, wherein the diffusion pattern is formed by applying a composition, comprised of the non-cross-linked polymer resin and cross-linked organic particles, on the transparent base sheet and has a spherical or semi-spherical shape.

10. The optical sheet as claimed in claim 9, wherein the polymer resin comprises thermosetting resin.

11. A backlight assembly including at least one optical sheet, the optical sheet comprising:
    a transparent base sheet; and
    a light diffusion layer in which a diffusion pattern comprised of a plurality of protrusions is formed on the transparent base sheet,
    wherein the diffusion pattern has an aspect ratio of 0.8 or more, the aspect ratio satisfies below:

$$\frac{\text{a thickness}(d) \text{ of the protrusion}}{\text{a radius}(l) \text{ of a unit body portion of the protrusion}} \geq 0.8.$$

12. The backlight assembly as claimed in claim 11, wherein the diffusion pattern has a surface shape formed by an e-beam irradiation apparatus which emits thermal electrons by heating a high-melting point material filament made of at least one selected from the group consisting of tungsten, tantalum and molybdenum.

13. The backlight assembly as claimed in claim 12, wherein the e-beam is irradiated within a wavelength range of 0.005 to 0.1 nm.

14. The backlight assembly as claimed in claim 12, wherein the e-beam is irradiated in an absorbed dose of 40 to 120 kGy.

15. The backlight assembly as claimed in claim 11, wherein the aspect ratio ranges from 0.8 to 1.5.

16. The backlight assembly as claimed in claim 11, wherein the plurality of protrusions has a spherical or semi-spherical shape.

17. The backlight assembly as claimed in claim 11, wherein the radius (l) of the unit body portion of the protrusion ranges from 0.005 to 50 μm.

18. The backlight assembly as claimed in claim 11, wherein the diffusion pattern is formed by applying a composition, comprised of the non-cross-linked polymer resin and cross-linked organic particles, on the transparent base sheet and has a spherical or semi-spherical shape.

19. The backlight assembly as claimed in claim 18, wherein the polymer resin comprises thermosetting resin.

20. A TFT-LCD, comprising:
a backlight assembly, the backlight assembly including at least one optical sheet, the optical sheet comprising:
a transparent base sheet; and
a light diffusion layer in which a diffusion pattern comprised of a plurality of protrusions is formed on the transparent base sheet,
wherein the diffusion pattern has an aspect ratio of 0.8 or more, the aspect ratio satisfies below:

$$\frac{\text{a thickness}(d) \text{ of the protrusion}}{\text{a radius}(1) \text{ of a unit body portion of the protrusion}} \geq 0.8.$$

* * * * *